US011545668B2

(12) United States Patent
Gariepy et al.

(10) Patent No.: US 11,545,668 B2
(45) Date of Patent: Jan. 3, 2023

(54) METHOD OF PRODUCING ELECTRODE MATERIAL FOR LITHIUM-ION SECONDARY BATTERY AND LITHIUM-ION BATTERY USING SUCH ELECTRODE MATERIAL

(71) Applicants: HYDRO-QUEBEC, Montreal (CA); SEI CORPORATION, Tsu (JP)

(72) Inventors: Vincent Gariepy, Drummondville (CA); Abdelbast Guerfi, Brossard (CA); Kazuma Hanai, Tsu (JP); Pierre Hovington, Boucherville (CA); Shinji Saito, Tsu (JP); Takehiko Sawai, Tsu (JP); Kazunori Urao, Tsu (JP); Karim Zaghib, Longueuil (CA)

(73) Assignee: HYDRO-QUEBEC, Montreal (CA)

( * ) Notice: Subject to any disclaimer, the term of this patent is extended or adjusted under 35 U.S.C. 154(b) by 14 days.

(21) Appl. No.: 14/437,347

(22) PCT Filed: Oct. 21, 2013

(86) PCT No.: PCT/CA2013/050793
§ 371 (c)(1),
(2) Date: Apr. 21, 2015

(87) PCT Pub. No.: WO2014/063244
PCT Pub. Date: May 1, 2014

(65) Prior Publication Data
US 2015/0270554 A1    Sep. 24, 2015

(30) Foreign Application Priority Data

Oct. 21, 2013  (CA) .................. CA 2794290

(51) Int. Cl.
| | |
|---|---|
| H01M 4/62 | (2006.01) |
| H01M 10/0525 | (2010.01) |
| H01M 4/58 | (2010.01) |
| H01M 4/485 | (2010.01) |
| H01M 4/587 | (2010.01) |
| C01B 25/45 | (2006.01) |
| H01M 4/36 | (2006.01) |

(52) U.S. Cl.
CPC ............ *H01M 4/625* (2013.01); *C01B 25/45* (2013.01); *H01M 4/485* (2013.01); *H01M 4/587* (2013.01); *H01M 4/5825* (2013.01); *H01M 10/0525* (2013.01); *H01M 4/366* (2013.01); *H01M 2220/20* (2013.01); *Y02E 60/10* (2013.01); *Y02P 70/50* (2015.11); *Y02T 10/70* (2013.01)

(58) Field of Classification Search
None
See application file for complete search history.

(56) References Cited

U.S. PATENT DOCUMENTS

| | | | |
|---|---|---|---|
| 6,855,273 B2 | 2/2005 | Ravet et al. | |
| 8,597,835 B2 | 12/2013 | Kawasaki et al. | |
| 2002/0047112 A1 | 4/2002 | Hosoya et al. | |
| 2009/0155689 A1 | 6/2009 | Zaghib et al. | |
| 2010/0078591 A1* | 4/2010 | Sano ..................... | H01M 4/587 252/182.1 |
| 2010/0119949 A1* | 5/2010 | Yano ..................... | H01M 4/13 429/232 |
| 2010/0243964 A1* | 9/2010 | Lee ....................... | H01M 4/134 252/503 |
| 2011/0068294 A1 | 3/2011 | Zaghib et al. | |
| 2011/0123858 A1 | 5/2011 | Zaghib et al. | |
| 2011/0266495 A2 | 11/2011 | Zaghib et al. | |
| 2012/0129052 A1 | 5/2012 | Bauer et al. | |
| 2012/0171566 A1 | 7/2012 | Yoshitake et al. | |
| 2012/0214070 A1* | 8/2012 | Yamamoto ........... | H01M 4/485 429/231.8 |
| 2012/0258363 A1 | 10/2012 | Kawasaki et al. | |
| 2013/0037758 A1 | 2/2013 | Kim et al. | |

FOREIGN PATENT DOCUMENTS

| | | |
|---|---|---|
| CA | 2 684 869 A1 | 11/2008 |
| CA | 2 716 265 A1 | 9/2009 |
| CA | 2 731 678 A1 | 2/2010 |
| CA | 2 761 239 A1 | 11/2010 |
| CN | 101841017 A | 9/2010 |
| CN | 102104144 A | 6/2011 |
| CN | 102299326 A | 12/2011 |
| CN | 102456881 A | 5/2012 |
| CN | 102569769 A | 7/2012 |

(Continued)

OTHER PUBLICATIONS

Reade, Carbon Black, last updated in 2018.*
Extended European Search Report dated May 12, 2016, issued by the European Patent Office in corresponding European Application No. EP 13849218.6-1360/2909879 (10 pages).
Wang et al., "Nano-LiFePO4/MWCNT Cathode Materials Prepared by Room-Temperature Solid-State Reaction and Microwave Heating", Journal of the Electrochemical Society, 2007, vol. 154, No. 11, pp. A1015-A1019, XP-002513827.
International Search Report (Form PCT/ISA/210) dated Jan. 7, 2014, by the Canadian Intellectual Property Office in corresponding International Patent Application No. PCT/CA2013/050793. (7 pages).

(Continued)

*Primary Examiner* — Anca Eoff
(74) *Attorney, Agent, or Firm* — Buchanan Ingersoll & Rooney P.C.

(57) ABSTRACT

A method for producing an electrode material for a lithium-ion secondary battery. The method includes the following steps: (a) mixing components of a basic ingredient or active substance of electrode material and a conductive carbon material to obtain a conductive carbon material-composited material; (b) mixing the conductive carbon material-composited material and a surface layer-forming material; an (c) burning the mixture obtained at step (b) to obtain the electrode material. Also, a lithium-ion secondary battery including an electrode which comprises the material.

21 Claims, 3 Drawing Sheets

(56) References Cited

FOREIGN PATENT DOCUMENTS

| | | | |
|---|---|---|---|
| CN | 102569796 | A | 7/2012 |
| EP | 2 509 143 | A2 | 10/2012 |
| EP | 2 562 854 | A | 2/2013 |
| JP | H-09-134724 | A | 5/1997 |
| JP | 2000-509193 | A | 7/2000 |
| JP | 2001-126733 | A | 5/2001 |
| JP | 2003-168429 | A | 6/2003 |
| JP | 2005-019399 | A | 1/2005 |
| JP | 2005-123107 | A | 5/2005 |
| JP | 2005135925 | A | 5/2005 |
| JP | 2005158721 | A | 6/2005 |
| JP | 2005285382 | A | 10/2005 |
| JP | 2006092969 | A | 4/2006 |
| JP | 2008034376 | A | 2/2008 |
| JP | 2008277232 | A | 11/2008 |
| JP | 2009043514 | A | 2/2009 |
| JP | 2009 301813 | A | 12/2009 |
| JP | 2010238575 | A | 10/2010 |
| JP | 2011515813 | A | 5/2011 |
| JP | 2011-108522 | A | 6/2011 |
| JP | 2011146284 | A | 7/2011 |
| JP | 2011-529257 | A | 12/2011 |
| JP | 2012-079464 | A | 4/2012 |
| WO | 2009/105863 | A1 | 9/2009 |
| WO | 2009/117871 | A1 | 10/2009 |
| WO | 2010/012076 | A8 | 2/2010 |
| WO | 2011132932 | A | 10/2011 |

OTHER PUBLICATIONS

Written Opinion of the International Searching Authority (Form PCT/ISA/237) dated Aug. 22, 2014, by the Canadian Intellectual Property Office in corresponding International Patent Application No. PCT/CA2013/050793. (9 pages).

Office Action (Notification of the Third Office Action) dated Feb. 14, 2018, by the State Intellectual Property Office of the People's Republic of China in corresponding Chinese Patent Application No. 201380054698.9, and an English Translation of the Office Action. (16 pages).

Office Action (Notice of Reasons for Rejection) dated Aug. 28, 2017, by the Japanese Patent Office in Japanese Patent Application No. 2015-537095, and an English Translation of the Office Action. (16 pages).

Office Action (Communication pursuant to Article 94(3) EPC) dated Nov. 28, 2018, by the European Patent Office in corresponding European Application No. 13 849 218.6-1103, 6 pages.

Wang Y. et al. "Developments in Nanostructured Cathode Materials for High-Performance Lithium-Ion Batteries" Advanced Materials, 2008, vol. 20, No. 12, pp. 2251-2269.

Wang J. et al. "Understanding and recent development of carbon coating on LiFePO4 cathode materials for lithium-ion batteries" Energy and Environmental Science, 2012, vol. 5, pp. 5163-5185.

Office Action (Communication pursuant to Article 94(3) EPC) dated Aug. 2, 2019, by the European Patent Office in corresponding European Application No. 13 849 218.6-1103, 6 pages.

Office Action (Notiification of Provisional Refusal) dated Sep. 5, 2020, by the Korean Patent Office in corresponding Korean Patent Application No. 10-2015-7013567, and an English Translation of the Office Action. (18 pages).

Office Action (Preliminary Rejection) dated Mar. 22, 2021, by the Korean Patent Office in corresponding Korean Patent Application No. 10-2015-7013567, and an English Translation of the Office Action (18 pages).

Office Action dated Mar. 23, 2021, by the Canadian Intellectual Property Office in Canadian Patent Application No. 2,888,561 (6 pages).

Office Action (Notification of the Fifth Office Action) dated Feb. 19, 2019 by the State Intellectual Property Office in corresponding Chinese Patent Application No. 201380054698.9, and an English Translation of the Office Action, (23 pages).

Office Action (Communication pursuant to Article 94(3) EPC) dated Mar. 31, 2022, by the European Patent Office n corresponding European Application No. 20 210 739.7-1103, 7 pages.

* cited by examiner

METHOD OF PRODUCING ELECTRODE MATERIAL FOR LITHIUM-ION SECONDARY BATTERY AND LITHIUM-ION BATTERY USING SUCH ELECTRODE MATERIAL

CROSS-REFERENCED TO RELATED APPLICATION

This application is a 35 USC 371 National Stage filing of International Application No. PCT/CA2013/050793 filed on Oct. 21, 2013, which claims the benefit of priority to Canadian Application No. 2,794,290 filed on Oct. 22, 2012. The disclosure of Canadian Application No. 2,794,290 is incorporated herein by reference in its entirety.

FIELD OF THE INVENTION

The present invention relates to a method of producing an electrode material for a lithium-ion secondary battery. The invention also relates to a lithium-ion secondary battery comprising the electrode material produced by the method of the invention.

BACKGROUND OF THE INVENTION

It is highly desirable for a lithium-ion secondary battery, to improve its energy density and performance when the battery is charged and discharged when a high electric current flows therethrough. Such improvement leads to optimization of the battery cycling characteristics. The cycles of the battery can be increased by as many as several tens of thousands. This allows for the battery to have a longer life.

Improving the performance of a lithium-ion secondary battery can be made by various ways. For example: (a) batteries having high charge capacities have been obtained by using a cathode material made of a lithium metal oxide and an anode material made of carbon; (b) by decreasing the particles size of the electrode materials, the specific surface areas of reacting particles is increased leading to a decrease of the electric resistance of the battery; (c) using a separator that is thin leads to a decrease of the liquid diffusion resistance.

When the particles of the electrode materials of the lithium-ion secondary battery are set small in the diameters, the reacting materials have an action of weakening the binding among particles, which has an impact on the electric resistance and life of the lithium-ion battery. It thus becomes necessary to increase the amount of binder in the materials. As a result, it is difficult to allow the battery to have a high charge capacity. A method has been suggested, which consists of forming secondary particles by aggregation of the small-diameter primary particles aggregated with one another, and enlarging the reaction area while keeping an apparent particle diameter. Such method is described for example in Japanese Patent Application Laid-Open No. 2012-79464.

Another difficulty encountered in attempting to improve the performance of lithium-ion secondary batteries is that the cathode and anode materials may peel or drop from the metal foil (electricity collector) on which they are deposited. This may lead to a short circuit inside the battery. In such situations, the safety of the battery is compromised due to a decrease in the voltage and a thermal runaway.

It is highly desirable to develop electrode materials that are thermally stable and that allow for the lithium-ion secondary battery to have a high capacity when it is charged and discharged at a high electric current. The use of a carbon conductive material to decrease the electric resistance of the electrode is known. This is described for example in Japanese Patent Application Laid-Open No. 2005-19399, Japanese Patent Application Laid-Open No. 2001-126733 and Japanese Patent Application Laid-Open No. 2003-168429.

In recent years, the use of a lithium-containing metal phosphate compound such as an olivine-type lithium iron phosphate as the active substance of the cathode has attracted rising attention. Such use is described for example in Japanese Patent Application Laid-Open No. 2000-509193 and Japanese Patent Application Laid-Open No. 9-134724. The olivine-type lithium iron phosphate as the active substance of the cathode allows for the improvement of the safety of the battery and for the decrease of the production cost. However, this active substance presents a problem in that it results in a cathode material which has a high electric resistance.

The present inventors have previously developed a method of compositing a conductive carbon material with the olivine-type lithium iron phosphate coated with carbon by burning. The method is described in Japanese Patent Application Laid-Open No. 2011-108522.

However, the method requires the olivine-type lithium iron phosphate to be purchased, and the conductive material to be composited therewith. This leads to an additional processing cost, since a secondary burning is performed to composite the conductive material with the olivine-type lithium iron phosphate. Also, the method presents a problem in that the conductive material is generally not sufficiently composited with the olivine-type lithium iron phosphate.

There is still a need for improved methods for the preparation of electrode materials that are stable and that allow for a battery to have a high charge capacity.

SUMMARY OF THE INVENTION

The inventors have designed a method of producing electrode material in which the configuration of the components is controlled. The method is cost-efficient and allows for the preparation of electrode material having a low electric resistance. The electrode material can be used as cathode material or as anode material. A lithium-ion secondary battery using a cathode or anode comprising the material according to the invention presents high charge capacity and good cycling characteristics.

The invention thus provides the following according to aspects thereof:

1. A method for producing an electrode material for a lithium-ion secondary battery, comprising:
   (a) mixing components of a basic ingredient or active substance of electrode material and a conductive carbon material to obtain a conductive carbon material-composited material;
   (b) mixing the conductive carbon material-composited material and a surface layer-forming material; and
   (c) burning the mixture obtained at step (b) to obtain the electrode material.
2. A method according to 1, wherein a hydrothermal reaction occurs during step (a).
3. A method according to 2, wherein the hydrothermal reaction is performed at a temperature of about 100 to 350° C., preferably about 180 to 220° C. for a period of less than about 24 hours, preferably about 3 to 5 hours.
4. A method according to 1, wherein a solid-phase reaction occurs during step (a).

5. A method according to 1, wherein step (b) comprises immersing the conductive carbon material-composited material into a water solution including the surface layer-forming material, and removing the water by drying.
6. A method according to 1, wherein step (c) is performed under inert atmosphere, at a temperature that is lower than a temperature at which the carbon material-composited material decomposes and that is higher than a temperature at which the surface layer-forming material forms activated covalent bonds with carbon atoms of the conductive material, for a period of about 3 to 12 hours, preferably about 3 to 5 hours.
7. A method according to 6, wherein the temperature at step (c) is about 500 to 800° C., preferably about 650 to 750° C.
8. A method according to 6, wherein the inert atmosphere is argon or nitrogen atmosphere.
9. A method according to 1, wherein the components of a basic ingredient or active substance of electrode material are a lithium-containing compound, a phosphorus-containing compound and a transition metal-containing compound.
10. A method of 9, wherein the basic ingredient or active substance of electrode material is an olivine-type lithium-containing transition metal phosphate compound such as $LiFePO_4$, $LiCoPO_4$, or $LiMnPO_4$.
11. A method of 9, wherein the basic ingredient or active substance of electrode material is $LiFePO_4$.
12. A method according to 1, wherein the conductive carbon material is carbon black, at least one type of fibrous carbon material, or a combination thereof.
13. A method according to 12, wherein the types of fibrous carbon material are of different sizes.
14. A method according to 12, wherein two types of fibrous material are used, a first type having a length of about 1000 to 3000 nm, preferably about 3000 nm and a diameter of about 5 to 15 nm, preferably about 10 nm; and a second type having a length of about 5000 to 10000 nm, preferably about 5000 nm and a diameter of about 70 to 150 nm, preferably about 100 nm.
15. A method according to 12, wherein a mass ratio of carbon black/fibrous carbon material is about 1-8/1-3.
16. A method according to 1, wherein the surface layer-forming material is an organic substance.
17. A method according to 16, wherein the organic substance is a sugar, preferably polysaccharide or lactose.
18. A method according to 1, wherein the electrode material is a cathode material.
19. A method according to 18, wherein a total content of carbon material in the cathode material is higher than about 2 mass %, preferably between about 5 to 15 mass %.
20. A method according to 1, wherein the electrode material is an anode material.
21. A method according to 20, wherein a total content of carbon material in the anode material is higher than about 1 mass %, preferably between about 2 to 5 mass %.
22. A method according to 20, wherein a coating layer of carbon material is formed on the basic ingredient or active substance, and a thickness of the layer is about 1 to 10 nm, preferably about 2 to 5 nm.
23. A method according to 20, wherein the anode material contains titanium.
24. An electrode material for a lithium-ion secondary battery obtained by a method as defined in any one of 1 to 23.
25. An electrode material for a lithium-ion secondary battery, comprising a basic ingredient or active substance of electrode material and at least two types of carbon material, wherein a first type of carbon material is a conductive carbon material and a second type of carbon material is provided as a coating on a surface of the basic ingredient.
26. An electrode material according to 25, wherein the conductive carbon material is carbon black, at least one type of fibrous carbon black, or a combination thereof.
27. An electrode material for a lithium-ion secondary battery according to 25, wherein the types of fibrous carbon material are of different sizes.
28. An electrode material for a lithium-ion secondary battery according to 25, wherein the fibrous material is of two types, a first type having a length of about 1000 to 3000 nm, preferably about 3000 nm and a diameter of about 5 to 15 nm, preferably about 10 nm; and a second type having a length of about 5000 to 10000 nm, preferably about 5000 nm and a diameter of about 70 to 150 nm, preferably about 100 nm.
29. An electrode material for a lithium-ion secondary battery according to 25, wherein the basic ingredient or active substance of electrode material is an olivine-type lithium-containing transition metal phosphate compound such as $LiFePO_4$, $LiCoPO_4$, or $LiMnPO_4$.
30. An electrode material for a lithium-ion secondary battery according to 25, wherein the basic ingredient or active substance of electrode material is $LiFePO_4$.
31. An electrode comprising a material obtained by a method as defined in any one of 1 to 23.
32. A lithium-ion secondary battery, wherein a cathode and/or an anode comprises an electrode material obtained by the method as defined in any one of 1 to 23.
33. A lithium-ion secondary battery, comprising an electrode comprising a material as defined in any one of 1 to 23.

DESCRIPTION OF PREFERRED EMBODIMENTS

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

As used herein, the word "a" or an when used in conjunction with the term "comprising" in the claims and/or the specification may mean "one", but it is also consistent with the meaning of "one or more", "at least one", and "one or more than one".

As used herein, the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein, the term "about" is used to indicate that a value includes an inherent variation of error for the device or the method being employed to determine the value.

As used herein, the term "graphene phase" means one layer of a plain six-membered ring structure of $sp^2$-connected carbon atoms.

As used herein, the term "amorphous layer" means a three-dimensional six-membered ring structure.

As used herein, phrase "carbon atoms form an activated covalent bond" means that electronic conduction is made owing to the bonding between the carbon atoms caused by turbulence of the graphene phase and/or the amorphous phase.

The inventors have designed a method for producing an electrode material for a lithium-ion battery, wherein components of a basic ingredient of electrode material are mixed with a conductive carbon material to obtain a conductive carbon material-composited material, which is then mixed with a surface layer-forming or coating material. The mixture is further burned to obtain the electrode material, which can be used either as cathode material or anode material.

Figure 1:
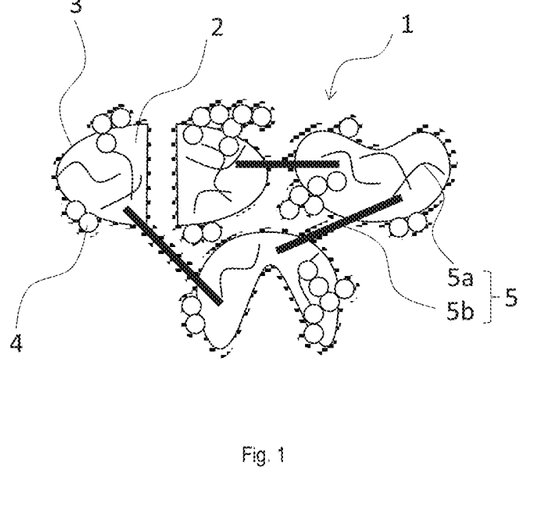
FIG. 1 is a pattern diagram of a cathode material for a lithium-ion secondary battery.

Turning to the figures, the electrode material for a lithium-ion secondary battery 1 is illustrated in FIG. 1. The material 1 comprises an active substance (basic ingredient of the electrode material), which can be an olivine-type lithium-containing transition metal phosphate compound 2. The material also comprises a carbon material 3 which can be a graphene phase, and a conductive carbon black 4. The material further comprises a conductive fibrous carbon material-containing material 5. The carbon material 3 forms a coating on the surface of the conductive fibrous carbon material-containing material 5. The lithium-containing transition metal phosphate compound 2 is composited with the conductive carbon black 4 and the conductive fibrous carbon material-containing material 5.

In embodiments of the invention, the fibrous carbon material-containing material 5 is a mixture of fibrous carbon materials 5a and 5b of different size. As illustrated on FIG. 1, each fibrous carbon material 5a has a small diameter and a short length, and each fibrous carbon material 5b has a large diameter and a long length. The fibrous carbon material 5a is disposed in the vicinity of the surface of the lithium-containing metal phosphate compound 2 and contributes to the bonding between portions of the compound 2, and the fibrous carbon material 5b contributes to the bonding between the compounds 2.

In embodiments of the invention, a cathode material is a lithium-containing metal compound.

As the lithium-containing metal, a lithium-containing metal oxide shown by $LiMO_2$ (M: at least one element of Co, Mn, Ni, and Al), a solid solution lithium-containing metal oxide shown by $Li_2MnO_3 \cdot LiMO_2$ (M: at least one element of Co, Ni, Mn), a lithium-containing metal phosphate compound shown by $LiMPO_4$ (M: at least one element of Fe, Co, and Mn), and a lithium-containing metal silicate compound shown by $LiMSiO_4$ (M: at least one element of Fe, Co, and Mn). Sulfur compounds can be also used as cathode material.

Examples of lithium-containing metal compounds include $LiFePO_4$, $LiCoPO_4$, and $LiMnPO_4$.

In embodiments of the invention, the active substance of the cathode material is an olivine-type lithium-containing transition metal phosphate compound. For example, the olivine-type lithium iron phosphate shown by $LiFePO_4$ is effective in its electrochemical property, safety, and cost.

In embodiments of the invention, anode material may comprise artificial or natural graphite, materials containing metal silicon or silicon oxide, and materials such as lithium titanate containing titanium. It is effective to form the layer of the carbon material on a surface layer of the anode material as a method of adding a carbon conductive material to the surface layer. The carbon conductive material improves the charge and discharge properties of the battery and the durability thereof.

In embodiments of the invention, the average diameter of the particles of the cathode material and the anode material is between about 50 and 30000 nm. When the average of the particle diameters of the cathode material is less than about 50 nm, an amorphous phase is generated, making it difficult to composite the cathode material with the conductive material. When the average diameter of the particle of the anode material exceeds a value of about 30000 nm, the number of contact points between particles becomes small, making ineffective the addition of conductive material to the electrode material. In preferred embodiments, the average diameter of the particle of the cathode material is between about 50 and 20000 nm and that the average of the particle diameters of the anode material is between about 4000 and 30000 nm.

The surface of each of the above-described electrode material is coated with the layer of the carbon material. At least one phase selected from among the graphene phase and the amorphous phase is formed on the surface of the layer of the carbon material.

There are various methods of forming the surface layer or coating of carbon materials. The following methods (a) through (d) of forming a thin film are known: (a) modifying the surfaces of particles of the electrodes by using an organic substance-containing solution as a surface layer-forming material and thereafter thermally decomposing the surface layer-forming material in a reducing atmosphere, (b) dispersing conductive carbon black such as acetylene black, Ketchen Black or graphite crystal in a solvent to form a slurry solution, dispersing particles of the electrode material in the slurry solution, and thereafter drying and removing the solvent; (c) an ion deposit method; and (d) a chemical evaporation method (CVD) and/or a physical evaporation method (PVD).

In embodiments of the invention, the production method relates to method (a) above. As described later, the surface layer is formed at the same time when components of the electrode material are synthesized into the electrode material.

In the present invention, the term "graphene phase" means one layer of a plain six-membered ring structure of $sp^2$-connected carbon atoms. The term "amorphous layer" means a three-dimensional six-membered ring structure. The phrase "carbon atoms form an activated covalent bond" means that electronic conduction is made owing to the bonding between the carbon atoms caused by turbulence of the graphene phase and/or the amorphous phase.

The carbon material coating the surface of the basic ingredient of the electrode material closely contacts the surface of each basic ingredient of electrode material. At least one phase selected from among the graphene phase and the amorphous phase is formed on the surface of the carbon material.

In embodiments of the invention, the thickness of the coating layer of the carbon material is between about 1 and 10 nm. When the thickness of the coating layer is less than about 1 nm, it is difficult to accomplish electronic conduction to be performed by the bonding of the carbon atoms. When the thickness of the coating layer is more than about 10 nm, the diffusion performance of lithium ions to the surface of the active substance responsible for the reaction of the battery becomes low. Therefore the output performance of the battery deteriorates. In preferred embodiments, the thickness of the coating layer is between about 2 and 5 nm.

In embodiments of the invention, the conductive material which is the carbon black and/or the fibrous carbon material. Conductive carbon black such as the acetylene black, the Ketchen black, and furnace black are can be used. The specific surface area of the conductive carbon black is between about 20 and 400 $m^2/g$.

The fibrous carbon material which can be used in the present invention is at least one selected from among a carbon nanotube and a carbon nanofiber. The term "carbon nanotube means" a tube consisting of a single-walled ring. The term "carbon nanofiber" means a tube consisting of a multi-walled ring.

In embodiments of the invention, the fibrous carbon material consisting of the carbon nanotube and the carbon nanofiber can be used. In preferred embodiments, at least two kinds of the fibrous carbon materials different in the fiber diameters and fiber lengths are used. That is, it is possible to use (a) the fibrous carbon materials different in both the fiber diameters and fiber lengths, (b) the fibrous carbon materials equal in the fiber diameters thereof and different in the fiber lengths, and (c) the fibrous carbon materials different in the fiber diameters and equal in the fiber lengths. Also, in more preferred embodiments, the fibrous carbon material having a small fiber diameter and a short fiber length and the fibrous carbon material having a large fiber diameter and a long fiber length in combination are used.

In embodiment of the invention, the diameter of the fibrous carbon material is between about 10 and 100 nm. In preferred embodiments, the fiber length is between about 100 and 10000 nm. It is difficult to carry out distributed production of the fibrous carbon material whose diameter is less than about 10 nm. The fibrous carbon material whose diameter exceeds about 100 nm contacts the electrode material at a small number of points and thus has a low effect. When the fibrous carbon material having a fiber length less than about 100 nm is used, it is difficult to dispersingly produce the fibrous carbon material and in addition fibrous carbon material contacts the electrode material at a small number of points. The fibrous carbon material having a fiber length exceeding about 10000 nm is broken a lot at a dispersion time, and few of them maintain the original fiber length. In preferred embodiments, the fibrous carbon material having the fiber length less than about 10000 nm is used in the present invention.

When a plurality of the fibrous carbon materials is used, the diameter of one type of the fibrous carbon materials is between about 5 and 15 nm, and the diameter of the other type is between about 70 and 150 nm. In preferred embodiments, the diameter of one type of fibrous material is about 10 nm, and the diameter of the other type is about 100 nm.

The fiber length of the fibrous carbon material having the diameter between about 5 and 15 nm is between about 1000 to 3000 nm, preferably about 3000 nm. The fiber length of the fibrous carbon material having the diameter between about 70 and 150 nm is in the range from about 5000 to 10000 nm, preferably about 5000 nm.

In the case of the cathode material, it is preferable that the total of the content of the cathode material, the carbon black, the fibrous carbon material, and the layer of the carbon material coating the surface of the fibrous carbon material is not less than about 2 mass %, and preferably in the range from about 5 to 15 mass %.

In preferred embodiments, the mixing ratio between the carbon black and the fibrous carbon material is: carbon black/fibrous carbon material=(about 2 to 8)/(about 1 to 3) in a mass ratio. In the case of the anode material, the total content of the carbon material is not less than about 1 mass %, preferably between about 2 to 5 mass %.

The method of producing basic ingredient of the electrode material for the lithium-ion secondary battery of the present invention by using the above-described materials is described below. The method of producing the cathode material consisting of the olivine-type lithium iron phosphate is described in detail below. The cathode material of the present invention consisting of the olivine-type lithium iron phosphate is synthesized through the following steps.

A first step of synthesizing a conductive material-composited material by adding the above-described conductive material to a water solution containing a lithium-containing compound, a phosphorous-containing compound, and a transition metal-containing compound and allowing them to hydrothermally react with one another:

A water solution of iron sulfate to which lithium hydroxide and citric acid, both of which are the materials of the olivine-type lithium iron phosphate are added and a water solution of phosphoric acid are prepared. The fibrous carbon material dispersed in water or ethanol and the carbon black are added to the mixed solution of the above-described components to hydrothermally synthesize them into the conductive material-composited material containing the olivine-type lithium iron phosphate, the conductive carbon black, and the conductive fibrous carbon material.

In preferred embodiments, the hydrothermal reaction is performed in a closed atmosphere at temperatures of about 100 to 350° C., preferably about 180 to 220° C.; for a time period of not more than about 24 hours, preferably about 3 to 5 hours.

The step of preparing the conductive composite material can be performed by a solid-phase reaction or any suitable reaction. In the solid-phase reaction, the conductive material, a lithium-containing compound, a phosphorus-containing compound, and a transition metal-containing compound are allowed to react together. As will be understood by a skilled person, reaction conditions of such solid-phase reaction can vary depending on the application.

A second step is performed, which consists of mixing the conductive material-composited material and the surface layer-forming material with each other to form a mixture.

As the surface layer-forming material which can be used in the present invention, it is possible to use any carbon source material capable of forming the activated covalent bond in combination with the carbon atoms of the conductive material. In embodiments of the invention, sugars are used as surface layer-forming material. Such sugars include polysaccharide and lactose.

By immersing the conductive material-composited material in a water solution of the lactose and thereafter drying and removing water, the conductive material-composited material having the surface thereof coated with the carbon source material is obtained.

A third step of burning the conductive material-composited material having the surface thereof coated with the carbon source material is performed.

The conductive material-composited material is burned in an inert atmosphere at a temperature that is not more than a temperature at which the conductive material-composited material is thermally decomposed and that is not less than a temperature at which the surface layer-forming material forms the activated covalent bond in combination with the carbon atoms of the conductive material. By burning the conductive material-composited material in the above-described condition, the surface layer-forming material is thermally decomposed. Thereby a composite cathode material having its surface coated with the surface layer having at least one phase selected from among the graphene phase and the amorphous phase is obtained. In preferred embodiments, the conductive material-composited material consisting of the olivine-type lithium iron phosphate is burned in a nitrogen atmosphere at a burning temperature of about 500 to 800° C., preferably about 650 to 750° C.; for a period of about 2 to 12 hours, preferably about 3 to 5 hours.

The method of producing the cathode material consisting of the olivine-type lithium iron phosphate has been described above. But it is possible to produce cathode materials consisting of other lithium-containing metal compounds by adding the carbon black and the conductive fibrous carbon material having a solution state to the cathode material at the cathode material synthesis step, thereafter mixing the surface layer-forming material with the above-described components, and thereafter performing one-time burning to composite the above-described components with one another.

In the case of the anode material, it is possible to generate the layer of the carbon material composited with the conductive carbon material on the surface of the graphite by adding the carbon black and the conductive fibrous carbon material having a solution state to the anode material consisting of graphite or the like, thereafter immersing the mixture of the above-described components in a water solution of the surface layer-forming material, and thereafter drying and burning the mixture.

Typically, the lithium-ion battery has a construction in which an electrolyte is penetrated into a group of electrodes wound or layered one upon another with a separator being interposed between a cathode plate and an anode plate or the group of electrodes is immersed in the electrolyte to repeatingly absorb and release lithium ions.

The cathode and anode plates are formed by applying paste containing the cathode material and a binding agent and paste containing the anode material and the binding agent to a respective electricity collection foil.

In embodiments of the invention, binding agents such as polyvinylidene fluoride (PVDF), carboxymethylcellulose (CMC), emulsion of styrene butadiene copolymer (SBR), polyvinyl alcohol (PVA), polyacrylic emulsion, and silicone emulsion are used.

In consideration of the binding property of the binding agent and the conductive property of the active substance, the amount of the binding agent is about 0.5 to 10 parts by mass for about 100 parts by mass of the active substance or basic ingredient.

In embodiments of the invention, in forming an electrode paste by using a water solution or a water dispersion of a water-soluble or water-dispersible resin as a binding agent, a dispersant and/or a surface-active agent to the binding agent are added at a mixing time. Dispersants such as cellulose derivatives can be used. The cellulose derivatives can be carboxymethylcellulose (CMC). Pyrrolidone derivatives can also be used.

The separator which can be used for the lithium-ion battery holds an electrolyte by electrically insulating the cathode and anode from each other.

The separator is made of a synthetic resin film or fibrous woven and nonwoven cloths. It is possible to use a single layer or a double layer of a film of olefin resin such as polyethylene, polypropylene or the like, a film having ceramic particles which coat the above-described films, and woven and nonwoven cloths of cellulose fiber, polyimide fiber, polyamide fiber, and glass fiber.

As electrolytes of the lithium-ion battery in which the group of electrodes is immersed, non-aqueous electrolytes containing lithium salts, ion-conducting polymers, and an ionic liquid are used.

As non-aqueous solvents in the non-aqueous electrolytes containing the lithium salts, ethylene carbonate (EC), propylene carbonate (PC), diethyl carbonate (DEC), dimethyl carbonate (DMC), methyl ethyl carbonate (MEC), organic dinitrile, organic sulfone, fluorinated carbonate ester, borate ester, and ester derivatives of these substance are listed. As the lithium salts which can be dissolved in the non-aqueous solvents, lithium hexafluorophosphate ($LiPF_6$), lithium boron tetrafluoride ($LiBF_4$), lithium trifluoromethanesulfonate ($LiSO_3CF_4$) are listed.

The cathode and anode materials for the lithium-ion secondary battery are formed by layering the cathode and anode materials on the surface of the cathode plate and that of anode plate respectively serving as electricity collectors. A metal thin film can be exemplified as the cathode plate. An aluminum foil can be exemplified as the electricity collector of the cathode. A copper foil and the aluminum foil can be exemplified as the electricity collector of the anode.

EXAMPLES

The synthesis of the cathode material of the present invention is described in detail below by way of examples and comparative examples. As an example, the synthesis of the cathode material consisting of the olivine-type lithium iron phosphate is described in detail below. The lithium-ion secondary battery using the cathode material consisting of the olivine-type lithium iron phosphate is described in detail below. But the present invention is not limited to the examples described below.

Synthesis of Cathode Material Consisting of Olivine-Type Lithium Iron Phosphate Composited with Conductive Carbon Material In an atmosphere of an inert gas such as argon or nitrogen, by using distilled water in which dissolved oxygen and residual ions were removed in advance, a 0.4M water solution of iron sulfate to which lithium hydroxide and citric acid which are the material of the olivine-type lithium iron phosphate were added and a 0.4M water solution of phosphoric acid were prepared. After the above-described components were mixed with one another such that the mole ratio among lithium, iron, and phosphorous contained in the total amount of the mixed solution was 3, 1, 1, pH of the mixed solution was adjusted to 8.5 to 8.8 by using appropriate ammonia water to prepare a suspension liquid.

The fibrous carbon material (diameter: 15 nm, fiber length: 10000 nm) dispersed at 5 mass % in water and the carbon black (specific surface area: 40 $m^2/g$) were added to the suspension liquid to prepare a slurry mixed solution. The mixed solution was supplied to a chamber dedicated to carrying out a hydrothermal synthesis reaction and heated at 200° C. for two hours to perform hydrothermal synthesis. Thereby the conductive carbon material-composited material composed of the olivine-type lithium iron phosphate composited with the conductive carbon material and the conductive fibrous carbon material was synthesized.

After the obtained composite material is filtered, cleaned, and dried, a lactose water solution adjusted to 10 wt % in advance was added to the conductive carbon material-composited material such that lactose was 10 wt % for the olivine-type lithium iron phosphate of the composite material. The dried conductive carbon material-composited material was thermally decomposed in a nitrogen atmosphere at 700° C. to obtain the cathode material in which the surface of the conductive carbon material-composited material was coated with at least one phase selected from among the graphene phase and the amorphous phase.

According to identification performed by means of an X-ray diffraction pattern, no by-products were found in the obtained cathode material, but it was confirmed that the obtained cathode material was in a crystalline state similar to that of the olivine-type lithium iron phosphate to be obtained by a normal hydrothermal synthesis method.

The average of the particle diameters of the cathode material measured by a light scattering method was 6000 nm. The thickness of the surface-coating layer measured by the electron microscopic photograph was 3 nm. The total of the content of the cathode material, that of the carbon black, that of the fibrous carbon material, and that of the layer of the carbon material coating the surface of the fibrous carbon material was 10 mass %.

Figure 2:
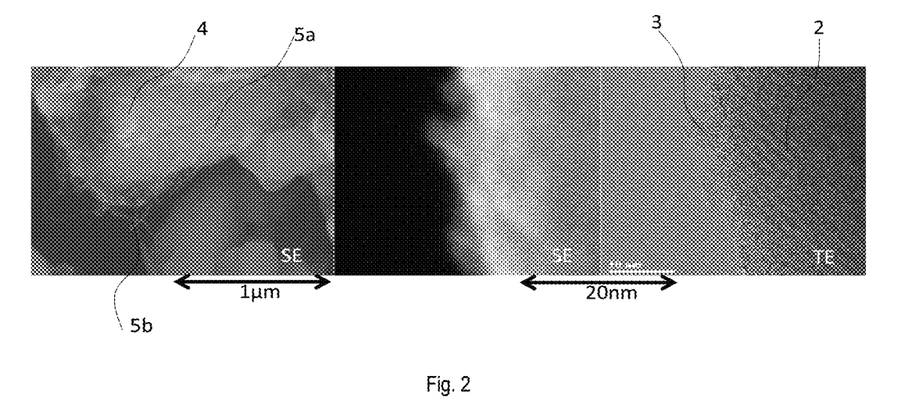
FIG. 2 shows a photograph of the surface of the cathode material taken by a scanning-type and a transmission-type electron microscope.

FIG. 2 shows an electron microscopic photograph of the cathode material synthesized by using the production method of the present invention.

A secondary electron image (SE) shows that an olivine-type lithium iron phosphate 2 is composited with a conductive carbon black 4 and a conductive fibrous carbon material 5. A bright-field image (TE: transmission electron) shows that the surface of the olivine-type lithium iron phosphate 2 is coated with the carbon material 3 such as the graphene phase.

Thereby electrons are conducted among the olivine-type lithium iron phosphate, the conductive carbon black, and the conductive fibrous carbon material not only by physical contact among them but also by bond among carbon atoms. Therefore it is possible for the lithium-ion secondary battery to obtain a low electric resistance. Thus the lithium-ion secondary battery is capable of having a high capacity when it is charged and discharged at a high electric current and maintaining this performance for a long time. That is, the battery obtains a long life.

Figure 3:
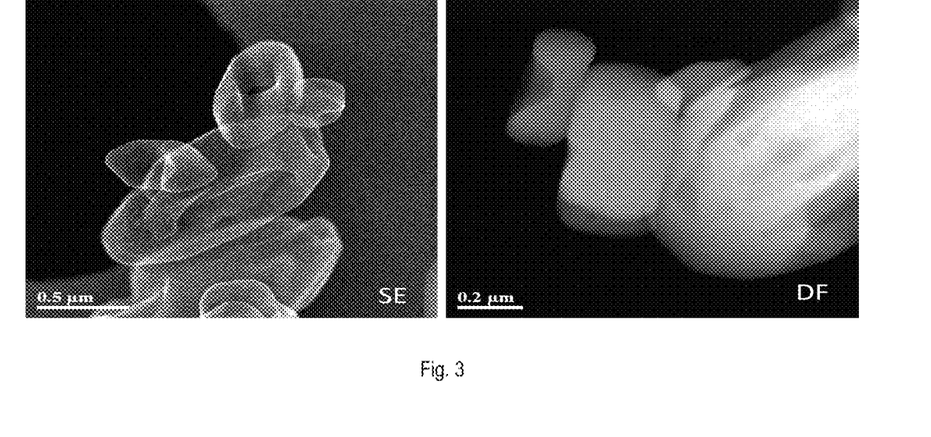
FIG. 3 shows a photograph of a lithium-containing metal phosphate compounds taken by a transmission-type electron microscope.

FIG. 3 shows an electron microscopic photograph of the configuration of the cathode material consisting of the olivine-type lithium iron phosphate synthesized by the production method of the present invention.

The secondary electron image (SE) shows that the surfaces of particles are depressed. A dark-field image (DF) shows that pores are present inside the olivine-type lithium iron phosphate.

Particles of the olivine-type lithium iron phosphate produced by the hydrothermal synthesis method take a spherical shape, a rod shape, an elliptic shape, and the like in dependence on a synthesis condition. In any shape, the particles of the olivine-type lithium iron phosphate of any of the above-described configurations had a comparatively flat configuration and not in contact with each other, i.e., were independent from each other. Secondary particles were formed owing to aggregation of particles caused by the presence of water. To increase the reaction area, heretofore, the size of particles of reacting substances is decreased and the surfaces thereof were flattened and smoothened. As a result, conventional particles have a problem that they had a high degree of independence and a low degree of binding performance.

On the other hand, the olivine-type lithium iron phosphate synthesized by the production method of the present invention had particle surfaces having pores and depressed surfaces.

In this case, there is an increase in contact points among the particles. Thus the technique of compositing the conductive material with the electrode material is capable of overcoming the conventional problem of a decrease of the number of contact points in the synthesis to be carried out by using the hydrothermal synthesis method by increasing the specific surface area of the particles and keeping the degree of independence thereof.

Production of Cathode

A cathode material in which various kinds of the olivine-type lithium iron phosphates were used and polyvinylidene fluoride (PVDF) dissolved in N-methyl-2-pyrrolidone (NMP) used as a binding agent were kneaded to obtain a cathode mixed agent (slurry).

As the solid content ratio between the materials constituting the cathode respectively, the ratio of basic ingredient of the electrode material to the PVDF was set to 94:6 mass %. The cathode mixed agent (slurry) was applied in an amount of 140 g/m$^2$ to an aluminum foil having a thickness of 20 μm and dried. Thereafter the slurry-applied aluminum foil was pressed and cut to obtain the cathode for the lithium-ion secondary battery.

In Example 1, at synthesis and burning steps, the olivine-type lithium iron phosphates and conductive materials were composited with each other. In a comparative example, the olivine-type lithium iron phosphate not subjected to compositing treatment at a synthesizing time, namely, the olivine-type lithium iron phosphate, synthesized by using a hydrothermal method, whose surface was coated with at least one phase selected from among the graphene phase and the amorphous phase was initially produced. Thereafter the conductive materials, namely, the conductive carbon black and the conductive fibrous carbon material were mixed with each other by using a kneading machine. In this manner, a cathode was produced (Comparative example 1).

By using the olivine-type lithium iron phosphate of the Comparative Example 1 before the conductive materials were mixed with each other, the cathode composed of the olivine-type lithium iron phosphate composited with the conductive materials was produced by a second-time burning (Comparative example 2).

In any of the electrodes, the content of the conductive carbon black, that of the conductive fibrous carbon material, and that of the surface-coating carbon phase were equal to each other.

Production of Anode

A mixture of a graphite carbon material and a carbon nanotube were kneaded by using a water based binder consisting of a water dispersion of styrene butadiene rubber and a water solution of CMC to produce an anode slurry.

The composition ratio among the graphite, the carbon nanotube, the SBR, and the CMC were set to 96/1/2/1 in mass %. The prepared slurry was applied in an amount of 80 g/m$^2$ to a copper foil having a thickness of 10 μm and dried. Thereafter the slurry-applied copper foil was pressed until it had a predetermined thickness to produce an anode plate.

Laminate type batteries each having 500 mAh were produced.

As a separator electrically partitioning the cathode plate and the anode plate from each other, nonwoven cloth made of cellulose fibers was used.

An electrolyte was prepared by dissolving 1 mol/l of lithium hexafluorophosphate (LiPF$_6$) in a solution containing EC and DEC mixed with each other at 30:70 at a volume ratio.

In a discharge performance test of the batteries, after each battery was initially charged, it was confirmed that the charge and discharge efficiency reached the neighborhood of 100%. Thereafter the discharge capacity of each battery measured when the battery was discharged up to 2.0V at a constant electric current of 100 mA was set as the capacity thereof.

By using a battery whose depth of discharge was adjusted to 50% (DOD: 50%) with respect to the capacity, a voltage change in the case where electric current flowed therethrough for three seconds in a current range of 100 to 1500 mA was measured to compute the DC resistance of each battery.

In a discharge performance test, the discharge capacity of each battery when it was discharged at electric current of 5000 mA flowed therethrough was compared with the discharge capacity thereof when it was discharged at the electric current of 100 mA and set as the discharge capacity maintenance ratio (%) thereof.

In a cycle performance test, the battery was charged at a constant electric current and a constant voltage (finished at 25 mA) of 4.0V (limited current of 1500 mA) and discharged up to 2.0V at a constant electric current of 1500 mA. The test was suspended for 10 minutes during each of the charge and discharge. This operation was repeated 1000 cycles. The ratio of the capacity of the battery at the 1000th cycle to the discharge capacity at the first cycle is set as the capacity maintenance ratio (%) at the 1000th cycle. The capacity maintenance ratio (%) is shown in Table 1.

TABLE 1

Test result of various charges and discharges

|  |  | DC resistance mΩ | Discharge capacity maintenance ratio % | Capacity maintenance ratio at 1000th cycle % |
|---|---|---|---|---|
| Example 1 | Material of present invention | 56 | 95 | 90 |
| Comparative example 1 | Mixed material | 83 | 79 | 75 |
| Comparative example 2 | Conventional composite material | 58 | 92 | 92 |

From the test results shown in Table 1, it was confirmed that the cathode material (Example 1) synthesized by the production method of the present invention had performance equivalent to that of the cathode material of the Comparative example 2 with which the conductive material was secondarily composited.

This shows that the synthesis method of the present invention is capable of producing the composite material composed of the olivine-type lithium iron phosphate having the intended structure, namely, the composite material composed of the olivine-type lithium iron phosphate in which through at least one phase selected from among the graphene phase and the amorphous phase, the surface of the conductive carbon black and that of the fibrous carbon material are composited with each other owing to conduction of electrons caused by the bonding between the carbon atoms. To composite the conductive materials with the olivine-type lithium iron phosphate by burning in synthesizing the olivine-type lithium iron phosphate is advantageous in the cost.

It was confirmed that the electrode material of Comparative example 1 in which the conductive materials were not composited with the electrode material, but were mixed with each other has a lower performance than the electrode materials of the Comparative example 2 and the Example 1 in which the conductive materials were composited with the electrode material by burning. The burning is effective in the cathode synthesis method of the example 1 and that of the Comparative example 2.

Comparison among the cathode materials of the Example 1, Comparative example 1, and the Comparative example 2 indicates that basic ingredient of the electrode material synthesized at one-time burning by the present invention has a property equivalent to the electrode materials of the comparative examples.

That is, the number of the heat treatment steps to be performed in the synthesis method of the present invention is smaller than that to be performed in the synthesis method of the conventional art and yet the electrode material of the present invention is allowed to have a property equivalent to that of the conventional electrode material. Therefore the production method of the present invention has a great superiority over the conventional production method in the production cost.

The above-described effect to be obtained was similar to that to be obtained in compositing the conductive material with cathode materials composed of other materials such as LiMO$_2$ (M: at least one of Co, Mn, Ni) and anode materials composed of graphite, lithium titanate, and the like by burning in synthesizing materials.

Regarding the addition amount of the conductive material, as examined in Comparative example 2 in which the electrode material and the conductive materials were composited with each other by carrying out two-time burning, when the addition amount of the conductive material was less than 2 mass %, the addition-caused effect became smaller.

Owing to the compositing technique, basic ingredient of the electrode material of the present invention for the lithium-ion secondary battery allows the lithium-ion secondary battery to have a high capacitance when it is charged and discharged while a high electric current is flowing therethrough and to be repeatingly charged and discharged stably for a very long time while a high electric current is flowing therethrough. Further it is possible to synthesize the olivine-type lithium iron phosphate and composite the conductive carbon material with the electrode material at the same time by carrying out the hydrothermal method. Therefore the lithium-ion secondary battery of the present invention can be preferably utilized for uses in which batteries are demanded to be charged and discharged at a high current, travel a long distance, and consume a large amount of fuel. Thus the lithium-ion secondary battery of the present invention can be utilized for electric vehicles and hybrid cars which are demanded to be produced at a low cost and durable and for a large-scale electric power storage stationary-type power source.

It is understood that the examples and embodiments described herein are for illustrative purposes only and that various modifications or changes in light thereof will be suggested to persons skilled in the art and are to be included within the present discovery and scope of the appended claims.

The present description refers to a number of documents, the content of which is herein incorporated by reference in their entirety.

The invention claimed is:

1. A method for producing an electrode material for a lithium-ion secondary battery, comprising:
   (a) mixing components of an active substance of electrode material and a conductive carbon material to obtain a solution, supplying the solution to a chamber, and carrying out a single hydrothermal reaction in the chamber to obtain a conductive carbon material-composited material, wherein the conductive carbon material comprises carbon black and at least one type of fibrous carbon material, wherein the hydrothermal reaction is performed for a period of less than 24 hours;
   (b) mixing the conductive carbon material-composited material and a surface layer-forming material to form a mixture, wherein the surface layer-forming material is adapted to form a surface layer on the conductive carbon material-composited material; and
   (c) burning the mixture obtained at step (b) to obtain the electrode material, wherein the surface layer-forming material forms a surface layer on the conductive carbon material-composited material.

2. The method according to claim 1, wherein the hydrothermal reaction is performed at a temperature of about 100 to 350° C.

3. The method according to claim 1, wherein a solid-phase reaction occurs during step (a).

4. The method according to claim 1, wherein step (b) comprises immersing the conductive carbon material-composited material into a water solution including the surface layer-forming material, and removing the water by drying.

5. The method according to claim 1, wherein step (c) is performed at a temperature that is higher than a temperature at which the surface layer-forming material forms activated covalent bonds with carbon atoms of the conductive carbon material, for a period of about 3 to 12 hours.

6. The method according to claim 1, wherein step (c) is performed at a temperature of about 500 to 800° C.

7. The method according to claim 1, wherein the components of the active substance of electrode material are a lithium-containing compound; a phosphorus-containing compound; and a transition metal-containing compound.

8. The method according to claim 1, wherein the conductive carbon material comprises a mixture of two types of fibrous material, a first type having a length of about 1000 to 3000 nm and a diameter of about 5 to 15 nm; and a second type having a length of about 5000 to 10000 nm and a diameter of about 70 to 150 nm.

9. The method according to claim 1, wherein a mass ratio of carbon black to fibrous carbon material is in the range of about 1:3 to about 8:1 .

10. The method according to claim 1, wherein the surface layer-forming material is an organic substance.

11. The method according to claim 1, wherein the electrode material is a cathode material, and a total content of carbon material in the cathode material is higher than about 2 mass %.

12. The method according to claim 1, wherein the electrode material is an anode material, and a total content of carbon material in the anode material is higher than about 1 mass %.

13. The method according to claim 1, wherein the electrode material is an anode material, and a thickness of the surface layer is about 1 to 10 nm.

14. The method according to claim 1, wherein the electrode material is an anode material containing titanium.

15. The method of claim 7, wherein the active substance is an olivine-type lithium-containing transition metal phosphate compound.

16. The method of claim 15, wherein the olivine-type lithium-containing transition metal phosphate compound is $LiFePO_4$, $LiCoPO_4$, or $LiMnPO_4$.

17. The method of claim 1, wherein the conductive carbon material comprises at least two types of fibrous carbon material, wherein the types of fibrous carbon material are of different sizes.

18. The method of claim 10, wherein the organic substance is a sugar.

19. The method of claim 18, wherein the sugar is a polysaccharide or lactose.

20. The method of claim 1, wherein the surface layer comprises at least one carbon phase selected from graphene phase and amorphous phase.

21. The method of claim 1, wherein step (c) is performed under inert atmosphere, at a temperature that is lower than a temperature at which the conductive carbon material-composited material decomposes.

* * * * *